United States Patent
Rogoff et al.

(10) Patent No.: US 10,712,174 B2
(45) Date of Patent: Jul. 14, 2020

(54) FILTER ACTIVATION AND DEACTIVATION BASED ON COMPARATIVE RATES

(71) Applicant: HONEYWELL INTL. INC., Morristown, NJ (US)

(72) Inventors: Stephen Forrest Rogoff, Glendale, AZ (US); LeRoy Ernest Vetsch, Glendale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 2250 days.

(21) Appl. No.: 13/648,581

(22) Filed: Oct. 10, 2012

(65) Prior Publication Data
US 2014/0100816 A1    Apr. 10, 2014

(51) Int. Cl.
*G01D 3/08* (2006.01)
*G01D 3/032* (2006.01)

(52) U.S. Cl.
CPC ............... *G01D 3/08* (2013.01); *G01D 3/032* (2013.01)

(58) Field of Classification Search
CPC   G01D 1/00; G01D 3/08; G01D 3/032; G05D 1/00
USPC .................. 702/176, 189, 190, 193
See application file for complete search history.

(56) References Cited

U.S. PATENT DOCUMENTS

| | | | |
|---|---|---|---|
| 4,327,437 A * | 4/1982 | Frosch ............... | G11B 3/08516 244/194 |
| 5,209,237 A | 5/1993 | Rosenthal | |
| 5,249,027 A | 9/1993 | Mathur et al. | |
| 5,469,447 A | 11/1995 | Brunemann, Jr. et al. | |
| 5,960,104 A | 9/1999 | Conners et al. | |
| 6,577,976 B1 | 6/2003 | Hoff et al. | |
| 6,594,620 B1 | 7/2003 | Qin et al. | |
| 6,782,742 B1 | 8/2004 | Adebjork et al. | |
| 7,093,168 B2 | 8/2006 | Mahoney | |

(Continued)

FOREIGN PATENT DOCUMENTS

| | | |
|---|---|---|
| CN | 101608927 | 12/2009 |
| DE | 10123625 | 11/2002 |

(Continued)

OTHER PUBLICATIONS

Yang, Temperature Sensors, Spring 2011.*

(Continued)

*Primary Examiner* — Michael P Nghiem
*Assistant Examiner* — Dacthang P Ngo
(74) *Attorney, Agent, or Firm* — Fogg & Powers LLC

(57) ABSTRACT

A system includes a plurality of sensors measuring a physical parameter; a processing unit communicatively coupled to the plurality of sensors and configured to receive sensor data from each of the plurality of sensors; wherein the processing unit is further configured to compare rates of change between sensor data for each individual sensor of the plurality of sensors and each of the other individual sensors of the plurality of sensors; wherein the processing unit is further configured to perform a first action when the rate of change of each of the plurality of sensors is within a first threshold of all of the other plurality of sensors; and wherein the processing unit is further configured to perform a second action when the rate of change of at least one of the plurality of sensors is not within the first threshold of at least another of the plurality of sensors.

18 Claims, 5 Drawing Sheets

(56) References Cited

U.S. PATENT DOCUMENTS

| | | | |
|---|---|---|---|
| 7,882,394 B2 | 2/2011 | Hosek et al. | |
| 2003/0185450 A1 | 10/2003 | Garakani et al. | |
| 2004/0148139 A1* | 7/2004 | Nguyen | G05B 23/0221 |
| | | | 702/189 |
| 2007/0218823 A1* | 9/2007 | Wolf | G01C 5/06 |
| | | | 454/72 |
| 2009/0312984 A1 | 12/2009 | Delajoud et al. | |
| 2011/0172918 A1* | 7/2011 | Tome | G01C 21/165 |
| | | | 701/500 |
| 2011/0201381 A1* | 8/2011 | Herz | G06F 1/3203 |
| | | | 455/550.1 |
| 2011/0213559 A1* | 9/2011 | Pollack | A61B 5/0008 |
| | | | 702/19 |

FOREIGN PATENT DOCUMENTS

| | | |
|---|---|---|
| EP | 2090986 | 8/2009 |
| JP | H01287702 | 11/1989 |

OTHER PUBLICATIONS

UK Intellectual Property Office, "Office Action from GB Application No. 1316771.3 dated Dec. 11, 2013", "from Foreign Counterpart of U.S. Appl. No. 13/648,581", filed Dec. 11, 2013, pp. 1-6, Published in: GB.

"Sensor Systems: Air Data Handbook", 2002, pp. 120, Publisher: Goodrich Corporation.

"Report of the Joint Defense Science Board Intelligence Science Board Task Force on Integrating Sensor-Collected Intelligence", Nov. 2008, pp. 1-116, Publisher: Office of the Under Secretary of Defense for Acquisition, Technology, and Logistics.

Jia, "PHD Thesis: Data Fusion Methodologies for Multisensor Aircraft Navigation Systems", Apr. 2004, pp. 1-264, Publisher: Cranfield University.

Merrill, "NASA Technical Memorandum 83695: Sensor Failure Detection for Jet Engines Using Analytical Redundancy", Jun. 1984, pp. 1-25.

Merrill, "NASA Technical Memorandum 101396: Sensor Failure Detection for Jet Engines", Nov. 1988, pp. 1-44.

Wasniowski, "Multi Sensor Data Fusion with Filtering", Sep. 2005, pp. 330-334.

Wong et al., "Sensor Data Qualification System (SDQS) Implementation study", Oct. 2008, pp. 1-16, Publisher: National Aeronautics and Space Administration.

State Intellectual Property Office, P.R. China, "Notification to Grant Patent Right for Invention from CN Application No. 201310755739.9, dated May 19, 2017", "from Foreign Counterpart of U.S. Appl. No. 13/648,581", filed May 19, 2017, pp. 1-5, Published in: CN.

State Intellectual Property Office, P.R. China, "Office Action from Cn Application No. 201310755739.9, dated Dec. 2, 2016", "from Foreign Counterpart U.S. Appl. No. 13/648,581", filed Dec. 2, 2016, pp. 1-18.

* cited by examiner

FILTER ACTIVATION AND DEACTIVATION BASED ON COMPARATIVE RATES

BACKGROUND

Systems that incorporate redundant sensors for increased integrity sometimes provide their outputs to other systems. Noise is sometimes present in the signals output from the sensors. Noise in the output signals from the sensors can have numerous causes, such as noise in the measured parameter itself or noise caused by the sensor itself. Noise caused by the measured parameter itself includes small fluctuations present in the measured parameter, such as a fluctuation in measured electrical fields, air pressure, water temperature, etc. Noise caused by the sensor itself includes noise caused by imperfections in the electrical circuits and/or mechanical components of the sensor.

In some systems, a filter is used to reduce the transient noise present in output signals. Filtering the output signals can have a negative impact on response time to changes in the measured parameter. In some cases, receiving systems do not allow time lags in the data and/or prefer or expect sensor outputs to have a response that is the same as the input to the sensors, plus some minimal transport delay. Some systems achieve rapid response to changing inputs by decreasing the level of signal filtering that is applied to the output signals. Increased signal filtering provides a more stable output with a substantial reduction in the signal variation caused by noise, including noise in the measured parameter itself and also noise in the electrical circuits.

Thus, known systems are only able to achieve a compromised level of noise reduction and rapid response time. While a noise free output is preferred, it is difficult to achieve when a rapid response time is also desired.

SUMMARY

A system includes a plurality of sensors measuring a physical parameter; a processing unit communicatively coupled to the plurality of sensors and configured to receive sensor data from each of the plurality of sensors; wherein the processing unit is further configured to compare rates of change between sensor data for each individual sensor of the plurality of sensors and each of the other individual sensors of the plurality of sensors; wherein the processing unit is further configured to perform a first action when the rate of change of each of the plurality of sensors is within a first threshold of all of the other plurality of sensors; and wherein the processing unit is further configured to perform a second action when the rate of change of at least one of the plurality of sensors is not within the first threshold of at least another of the plurality of sensors.

DRAWINGS

Understanding that the drawings depict only exemplary embodiments and are not therefore to be considered limiting in scope, the exemplary embodiments will be described with additional specificity and detail through the use of the accompanying drawings in which.

Figure 1:
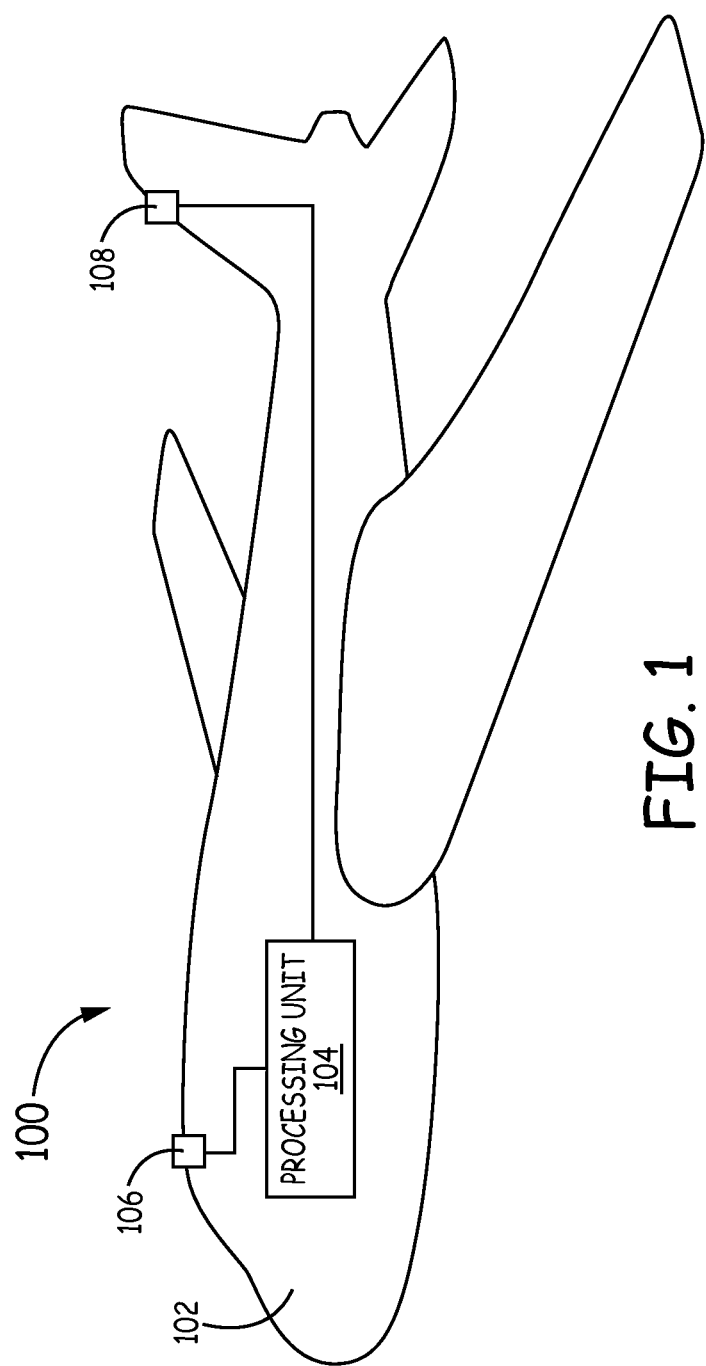
FIG. 1 is a general diagram depicting an exemplary embodiment of a sensor filtering system implemented onboard an aircraft according to the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification are not to be construed as limiting the order in which the individual steps may be performed. The following detailed description is, therefore, not to be taken in a limiting sense.

FIG. 1 is a general diagram depicting an exemplary embodiment of a sensor filtering system 100 implemented onboard an aircraft 102. Sensor filtering system 100 includes a processing unit 104 communicatively coupled to a first sensor 106 and a second sensor 108. While sensor filtering system 100 is shown in FIG. 1 implemented on board aircraft 102 (including jets, planes, helicopters, blimps, and balloons), it is understood that in other exemplary embodiments sensor filtering system 100 is onboard other vehicles, such as space vehicles, sea vessels (including ships and submersibles), and ground vehicles; missiles, rockets, and other ballistics and projectiles; integrated into systems worn by individuals on ground, in structures or caverns, in air, on or in water, or in space; integrated into buildings, other structures, and/or caverns; used in manufacturing, fabricating, mining, extracting, and refining processes and systems; or is integrated in other ways and for other uses.

In exemplary embodiments of sensor filtering system 100 implemented onboard aircraft 102, processing unit 104 is integrated into avionics and/or air data systems, software, and functions, such as the flight management computer, flight control computer, and flight management function. In exemplary embodiments, sensor filtering system 100 is implemented as a part of a virtual integrated avionics package or other software function in an avionics and/or air data system. In exemplary implementations, sensor filtering system is integrated into a sensor specific application that may have its own hardware or shared hardware and/or implemented using a generic processing resource. In exemplary implementations, sensor filtering system is integrated into its own separate computer or into an inertial computer/function, engine control computer/function, etc.

First sensor 106 and second sensor 108 sense the same physical parameter. Example physical parameters include, but are not limited to speed and/or velocity (including aircraft air speed and/or velocity, the speed and/or velocity of another object, person, or vehicle, the speed and/or velocity of a substance in a system, and other speeds and/or velocities measured in various ways), acceleration (including linear acceleration measured by accelerometers, angular acceleration measured by gyroscopes, and other accelerations/rates measured by inertial measurement units and sensors), pressure (such as barometric pressure, engine pressure, etc.), altitude and/or depth (such as aircraft altitude or submarine depth), distance, location (such as GNSS receivers), temperature (such as air temperature, water temperature, engine temperature, and other gas, liquid, and solid temperatures), level of something stored (such as fuel, oxygen, or other gas fluids or solids), etc. Accordingly, example sensors include air data sensors, speed and/or velocity sensors (such as air speed and/or velocity sensors), accelerometers, gyroscopes, inertial measurement units, pressure sensors, altitude and depth sensors, distance sensors, location sensors, temperature sensors, stored level sensors, etc.

Figure 2:
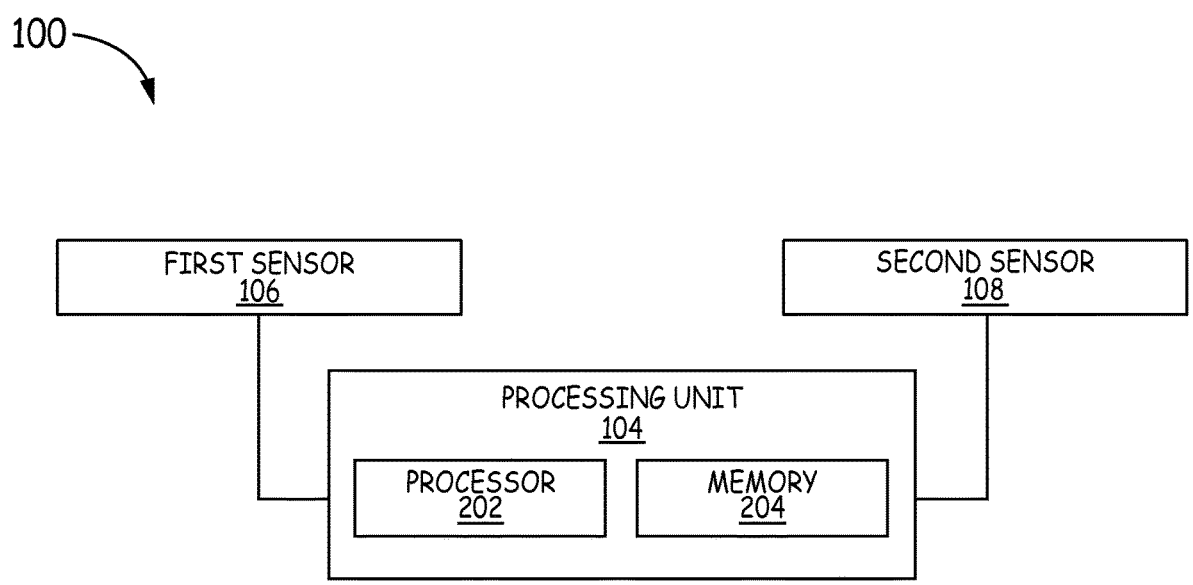
FIG. 2 is a block diagram depicting an exemplary embodiment of the sensor filtering system of FIG. 1.

FIG. 2 is a block diagram depicting sensor filtering system 100 implemented onboard the aircraft 102. As described above, sensor filtering system 100 includes processing unit 104, first sensor 106, and second sensor 108. Generally, processing unit 104 receives sensor data from first sensor 106 and second sensor 108. More specifically, processing unit 104 includes a processor 202 communicatively coupled to memory 204. In exemplary embodiments, the processor 202 implements logic that performs selective filtering based on the rates of change in the measured physical parameters from first sensor 106 and second sensor 108. In exemplary embodiments, memory 204 stores computer readable instructions executable by the processor 202 and used to implement logic that performs the selective filtering. In exemplary embodiments, memory 204 stores data from the first sensor 106 and the second sensor 108 regarding the measured physical parameters, including current measured sensor data, historical sensor data, and/or averaged and filtered historical sensor data.

Noise in the measured physical parameter, caused by either noise in the physical parameter itself or noise introduced by imperfections in the sensor (such as the electronics or mechanics of the sensor) is undesirable. In addition, a fast response time is desirable when there is an actual change in the data provided by the sensor. Processing unit 104 (through logic implementing the selective filtering using processor 202) of system 100 helps to minimize noise during periods of little or no change while maintaining a quick response time to actual changes. Processing unit 104 receives first raw sensor data from first sensor 106 and second raw sensor data from second sensor 108. Processing unit 104 determines a first rate of change of the first raw sensor data and a second rate of change of the second raw sensor data.

Processing unit 104 further compares the first rate of change with the second rate of change. In exemplary embodiments, while the rate of change of the output of sensor 106 and sensor 108 are within a threshold of each other (indicating that they are changing at approximately the same rate and in the same direction), system 100 determines that the changes in the outputs from the first sensor 106 and the second sensor 108 are more likely actual legitimate changes in the measured physical parameters and are not filter at all. This enables a very quick response time to the actual changes in the measured physical parameters. In contrast, when the rate of change of the output of first sensor 106 and the second sensor 108 are not within a threshold of each other, system 100 determines that the changes in the outputs are more likely noise in the output of at least one of the first sensor 106 and the second sensor 108 and the outputs from the first sensor 106 and the second sensor 108 are filtered more heavily.

In exemplary embodiments, first sensor 106 and second sensor 108 are redundant sensors. In exemplary embodiments, additional sensors are also included in the system 100. In exemplary embodiments, first sensor 106 and second sensor 108 are the same type of sensor sensing the same physical parameter. In exemplary embodiments where the first sensor 106 and the second sensor 108 are redundant sensors of the same type, there may be more narrow thresholds between the rate of change in the sensor data from the first sensor 106 and the second sensor 108 within which the filtering of the sensor data is minimized or turned off.

In other embodiments, first sensor 106 and second sensor 108 are different types of sensors sensing the same physical parameters. For example, first sensor 106 may sense a particular physical parameter using a first technology while second sensor 108 may sense the same particular physical parameter using a second technology. In this case, the unique technology of each of the first sensor 106 and the second sensor 108 may cause the sensed physical output to be slightly different at different times. For example, a first sensor 106 of a first type implementing a first technology may have a faster response time than a second sensor 108 of a second type implementing a second technology. Thus, the first sensor 106 may respond to changes in the sensed physical parameter more quickly than the second sensor 108. In other examples, the first sensor 106 of the first type implementing the first technology may inherently provide a more stable output than the second sensor 108 of the second type implementing the second technology. Thus, the output of the first sensor 106 may not change while the output of the second sensor 108 changes. In exemplary embodiments where the first sensor 106 and the second sensor 108 are different types of sensors sensing the same physical parameters, there may be larger allowable thresholds between the rate of change in the sensor data from the first sensor 106 and the second sensor 108 within which the filtering of the sensor data is minimized or turned off.

Figure 3A:
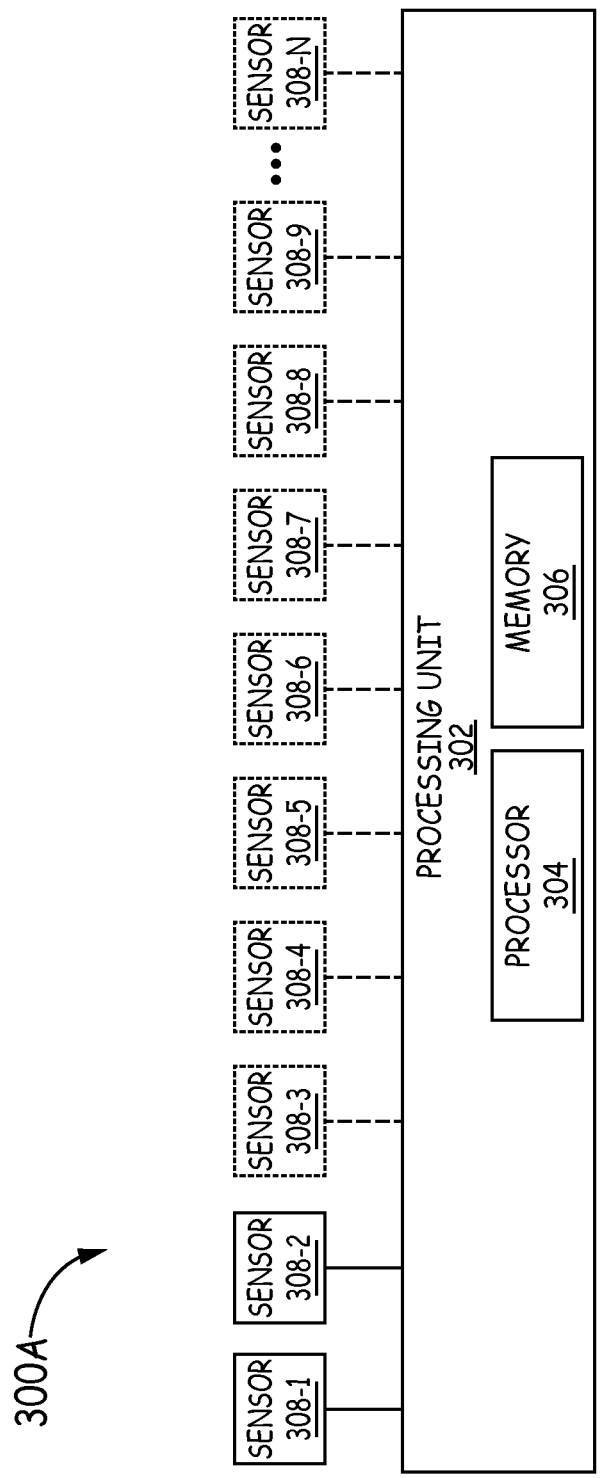
FIGS. 3A-3B are block diagrams depicting additional exemplary embodiments of sensor filtering systems according to the present disclosure.
Figure 3B:
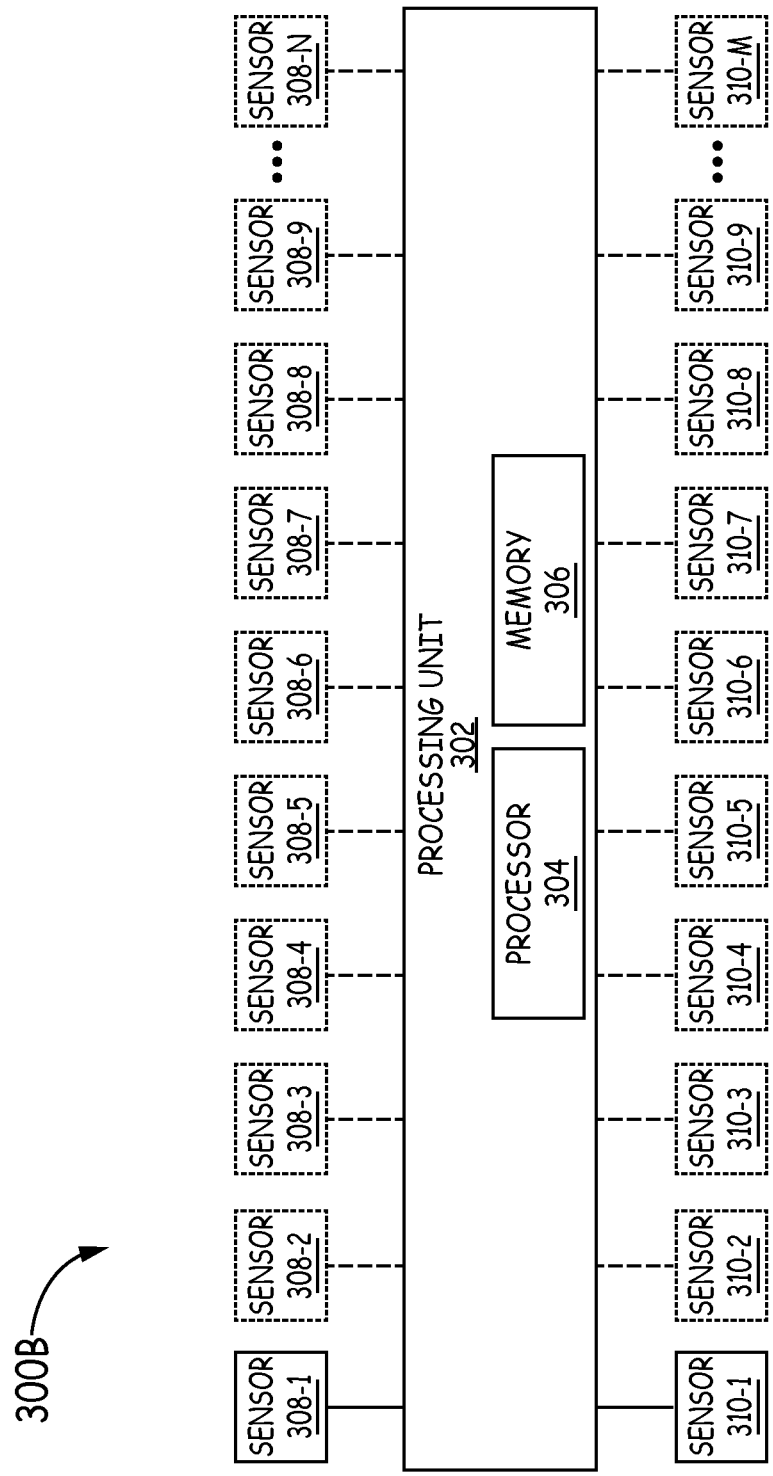

FIGS. 3A-3B are block diagrams depicting additional exemplary embodiments of sensor filtering systems 300. While any of sensor filtering systems 300 may be implemented on aircraft (including jets, planes, helicopters, blimps, and balloons), they can also be implemented onboard other vehicles, such as space vehicles, sea vessels (including ships and submersibles), and ground vehicles; missiles, rockets, and other ballistics and projectiles; integrated into systems worn by individuals on ground, in structures or caverns, in air, on or in water, or in space; integrated into buildings, other structures, and/or caverns; used in manufacturing, fabricating, mining, extracting, and refining processes and systems; or is integrated into other ways and for other uses. Each of FIGS. 3A-3B illustrates a different embodiment of sensor filtering system 300, labeled 300A-300B respectively.

FIG. 3A is a block diagram depicting an exemplary embodiment of a sensor filtering system 300A including a processing unit 302 having a processor 304 and a memory 306 and a plurality of sensors 308 of the same type (including at least sensor 308-1 and sensor 308-2 along with optional sensors 308-3 through sensor 308-N). In exemplary embodiments, processing unit 302 is communicatively coupled to sensors 308. In exemplary embodiments, processor 304 of processing unit 302 is communicatively coupled to memory 306 of processing unit 302. In exemplary embodiments, processing unit 302 (and more specifically, processor 304) implements the selective filtering described herein. In exemplary embodiments, sensor 308-1 and sensor 308-2 (and any of optional sensors 308-3 through 308-N that are also present) are redundant sensors. In exemplary embodiments, sensor 308-1 and sensor 308-2 are the same type of sensor sensing the same physical parameter. In exemplary embodiments, where sensor 308-1 and sensor 308-2 are redundant sensors of the same type, the threshold between the rate of change in the sensor data from any two sensors (such as sensor 308-1 and sensor 308-2) may be relatively narrow because the differences in the rate of change between any two redundant sensors of the same type is expected to be relatively low.

In exemplary embodiments, the rate of change of data for each individual sensor of the plurality of sensors 308 is compared with the rate of change of all of the other individual sensors of the plurality of sensors 308 to determine whether any difference between each rate of change pair falls within a threshold/range. When the differences between the rates of change of each of the pairs fall within the threshold/range, either minimal or no filtering of the sensor data of the plurality of sensors is performed. In contrast, when the differences between the rates of change of each of the pairs do not fall within the threshold/range, the sensor data of the plurality of sensors is filtered more than when the differences between the rates of change of each of the pairs fall within the threshold/range. While this determination of whether the rates of change fall within predetermined thresholds is used to decide if and/or how much to filter sensor data in exemplary embodiments, it can also be used to take other actions other than selective filtering.

In exemplary embodiments, the processing unit 302 determines the rate of change for each sensor 308 by differencing a previous sensor sample from a current sensor sample and dividing that by the sensor sample step size. More specifically, processing unit 302 determines the delta (difference) between the current sensor sample and the previous sensor sample for each sensor. For example: $\Delta Sensor_1 = Sensor_1(t) - Sensor_1(t-1)$; $\Delta Sensor_2 = Sensor_2(t) - Sensor_2(t-1)$; and $\Delta Sensor_3 = Sensor_3(t) - Sensor_3(t-1)$. In exemplary embodiments, it is assumed that the sensor data is valid before the delta (differences) are calculated. In other exemplary embodiments, sensor validity is tested before the function is performed and any known invalid data is excluded from the delta (difference) determinations. In exemplary embodiments, it is important to ensure that sensor data being used for the deltas is captured at the same time. In exemplary embodiments, if the sensor data is not captured at the same time, the time difference can lead to the wrong state of the filter for a few cycles of readings.

Once all the deltas have been computed, processing unit 302 determines whether all of the deltas are moving at approximately the same rate in the same direction by determining the quotient for each pair of deltas. In exemplary implementations, the sensor data can be moving in either a positive or a negative direction and thusly, the deltas can be positive or negative as well. Before processing unit 302 determines the quotient, processing unit 302 determines whether the delta (difference) between the current sensor sample and the previous sensor sample is zero for any of the sensor combinations. If the processing unit 302 determines that any delta (difference) for any pair of sensors 308 is equal to zero, then the filter is activated and the remaining steps are bypassed. This is because the sensor data is presumed to be static and not changing if at least one of the deltas is zero. Also, when one or more are equal to zero, processing unit 302 cannot calculate the quotient because it cannot risk a division by zero. Thus, if any of the deltas equals zero, then the filter is activated.

Otherwise, processing unit 302 further determines the quotient for each sensor pair. For example: $Quotient_1 = \Delta Sensor_1 / \Delta Sensor_2$; $Quotient_2 = \Delta Sensor_1 / \Delta Sensor_3$; and $Quotient_3 = \Delta Sensor_2 / \Delta Sensor_3$. Processing unit 302 further compares each quotient with a lower limit and an upper limit to determine whether each quotient falls within the range created by the lower limit and the upper limit. For example: $LowLimit < Quotient_1 < HighLimit$; $LowLimit < Quotient_2 < HighLimit$; $LowLimit < Quotient_3 < HighLimit$. While every combination of quotients for all of the sensors that will be included in the final results is required, in exemplary embodiments it is not necessary to determine the inverse quotient combinations because they will be accommodated by the range test and the relationship of the lower limit and upper limit. In exemplary embodiments, unless all the delta rates are either all positive or all negative, one or more of the quotients will be negative and the use of positive threshold values enables detection of delta rates that are not all moving in the same direction. Accordingly, a negative sign in one of the quotients indicates that at least one of the sensors data change is in the opposite direction of the others. In exemplary embodiments the total number of quotients that must be determined is equal to the sum of the sensor numbers from 1 to N-1 included in the system 300A. For example, the number of quotients for the 5 sensor case is: 1+2+3+4=10 quotients and the number of quotients for the 3 sensor case is: 1+2=3 quotients.

As noted above, the range text and the relationship between the lower limit and the upper limit allows a single range to detect both the quotient and its reciprocal. Thus, the lower limit is selected to be whichever of the quotient and the reciprocal is smaller and the higher limit is selected to be whichever of the quotient and the reciprocal is larger. For example, if it was desired that the threshold value between the various sensor pair combinations was that one of the pair be within 25% of the other of the pair, then the lower limit would be 0.75 or ¾ (which is within 25% of 1) and the upper limit would be 1.333 or 4/3 (which is the reciprocal of 0.75 or ¾ and is also within 25% of 1). Similarly, if the threshold value between the various sensor pair combinations was that one of the pair be within 10% of the other of the pair, then the lower limit would be 0.90 or 9/10 and the upper limit would be 1.111 (which is the reciprocal of 0.9 or 9/10 and is within 10% of 1).

In exemplary embodiments, if all quotients are within the range provided by the lower limit and the upper limit, then the filter is deactivated. This is because all of the sensor data is changing at a similar rate in the same direction so that we can assume that a real rate is occurring (that we need to keep up with) and that the change is not being caused by noise. In exemplary embodiments, if one or more quotients are not within the range provided by the lower limit and the upper limit, then the filter is activated. This is because not all of the sensor data is changing at a similar rate in the same direction and the lack of agreement on the rate change taking place is caused by noise or unexpected variations on the inputs. It is understood that as the number of sensors increase, so to do the number of deltas and quotients calculated. In exemplary embodiments, one quotient is calculated for each sensor pair.

One problem with selecting a small percentage difference for the range is that small percentage differences require very low system noise as well as nearly identical results from each sensor. In exemplary embodiments, the system noise and sensor to sensor variation will make it difficult to utilize a small percentage difference as a threshold. Modeling of the expected rate changes and error sources can be used with various percentages to determine the best threshold percentage (and thusly best range) that allows minimum rate changes without filtering given the system noise constraints.

FIG. 3B is a block diagram depicting an exemplary embodiment of a sensor filtering system 300B including processing unit 302 having processor 304 and memory 306, at least one sensor 308 of a first type (including at least sensor 308-1 along with optional sensors 308-2 through 308-N), and at least one sensor 310 of a second type (including at least one sensor 310-1 along with optional sensors 310-2 through 310-M). In exemplary embodiments, processing unit 302 is communicatively coupled to at least one sensor 308 and at least one sensor 310. In exemplary embodiments, processor 304 of processing unit 302 is communicatively coupled to memory 306 of processing unit 302. In exemplary embodiments, processing unit 302 (and more specifically, processor 304) implements the selective filtering described herein. In exemplary embodiments, the at least one sensor 308-1 is of a first type and the at least one sensor 310-1 is of a second type and the first and second types are different types of sensors that measure the same physical parameter. In some implementations, the two different types of sensors use dissimilar technologies to measure the same physical parameter.

Instead of requiring at least two sensors 308 of the same type (as in system 300A), system 300B requires at least one sensor 308-1 of a first type and at least one sensor 310-1 of a second type. Even with this difference, the principles described with regards to system 300A above still apply. The only difference is that there needs to be at least one sensor 308-1 of the first type and one sensor 310-1 of the second type. In exemplary embodiments, the response characteristics of the first type of sensor and the second type of sensor are different. In exemplary embodiments, the rate of change of data for each individual sensor of the plurality of sensors 308 and sensors 310 is compared with the rate of change of all of the other individual sensors of the plurality of sensors 308 and sensors 310 to determine whether any difference between each rate of change pair falls within a threshold/range. When the differences between the rates of change of each of the pairs fall within the threshold/range, either minimal or no filtering of the sensor data of the plurality of sensors is performed. In contrast, when the differences between the rates of change of each of the pairs do not fall within the threshold/range, the sensor data of the plurality of sensors is filtered more than when the differences between the rates of change of each of the pairs fall within the threshold/range. Thus, system 300B enables smoothing sensor data from dissimilar sensors that are measuring the same physical parameter.

In exemplary embodiments, the range test and the relationship between the lower limit and the upper limit allows a single range to detect both the quotient and its reciprocal. Thus, the lower limit is selected to be whichever of the quotient and the reciprocal is smaller and the higher limit is selected to be whichever of the quotient and the reciprocal is larger. In examples implementing at least one sensor 308-1 of a first type and at least one sensor 310-1 of a second type, the threshold value between the various sensor pair combinations may be larger to allow for more variation in the rates of change that may be inherent in the two types of sensors. For example, if it was desired that the threshold value between the various sensor pair combinations was that one of the pair be within 50% of the other of the pair, then the lower limit would be 0.5 or ½ (which is within 50% of 1) and the upper limit would be 2 (which is the reciprocal of 0.5 and is also within 50% of 1). It is understood that different upper and lower limits can be selected to balance the desire for fast response with the desire to filter the noise.

While system 300A shows two different types of sensors, it is understood that greater quantities of different types of sensor can also be included in other embodiments. Exemplary embodiments of system 300B include various pluralities of sensors 308 of the first type of sensors and sensors 310 of the second type of sensors. In some embodiments, sensors from multiple sensor types (such as at least one sensor 308, at least one sensor 310, and sensors from other sensor types) are used so as to minimize the possibility that there is a common mode failure that affects both sensor types (where two or more sensors of the same sensor type can all read the same and can all be wrong because they all have the same failure mechanism, while multiple sensors of the same type (such as multiple sensors 308 are multiple sensors 310) are also used for redundancy.

In exemplary embodiments of any of systems 100, 300A, and/or 300B, there is either filtering or no filtering based on the logic described above. In other exemplary embodiments of any of systems 100, 300A, and/or 300B, there is either more or less filtering based on the logic described above. For example, some embodiments may allow some minor filtering, such as average data between the sensors, when the rate of change of all of the plurality of sensors are not within a threshold of each other while performing more filtering when the rate of change of all of the plurality of sensors are within a threshold of each other. In other embodiments, one of the sensors is selected as the default sensor if no filtering is being performed such that its value is used as the value when no filtering is performed and a filtered combination of the values from a plurality of sensors is used when filtering is performed. In other exemplary embodiments, some other action is taken based on the described logic instead of, or in addition to, filtering or not filtering.

Exemplary embodiments of any of systems 100, 300A, and/or 300B or variations on them are not limited to a single threshold or even to the activation/deactivation of a filter. Any number of thresholds could be used as well as a continuously variable relationship to cause multiple different filters to be activated. For example, any of systems 100, 300A and/or 300B or variations on them could have multiple levels of thresholds so that multiple different behaviors occurred dependent on the threshold. For example, if all of the rate pairs are within a first range (first threshold), the system could behave a first certain way; if all of the rate pairs are not within the first range (first threshold), but are within a second broader range (second threshold), the system could behave in a second certain way; etc. Thus, in exemplary embodiments there are multiple different types of high and/or low limits that can be nested to have multiple different reactions.

In exemplary embodiments, method 400 further includes performing an optional third action when the rates of change of at least one of the plurality of sensors is not within the first threshold of at least another of the plurality of sensors and when the rates of change of each of the plurality of sensors is within a second threshold of all of the other plurality of sensors, wherein the second threshold is larger than the first threshold.

In addition, while activation/deactivation of a filter has been discussed herein, it is understood that the systems and methods described herein could also apply to other types of behavior or action where the state of the input data can be used to select a broad range of activations/deactivations.

Figure 4:
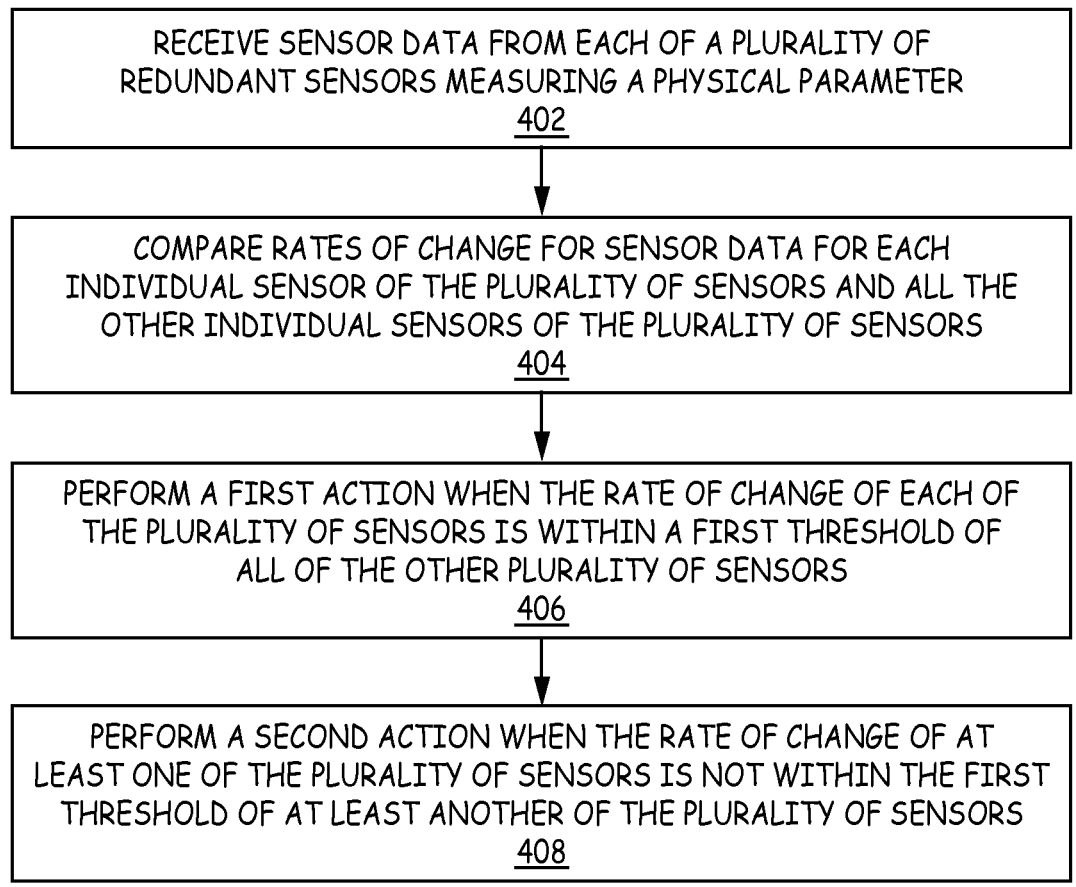
FIG. 4 is a flow diagram depicting an exemplary embodiment of a method according to the present disclosure.

FIG. 4 is a flow diagram depicting an exemplary method 400. Exemplary method 400 begins at block 402 with receiving sensor data from each of a plurality of sensors measuring a physical parameter. In exemplary embodiments, at least a first set of the plurality of sensors are of a similar type. In exemplary embodiments, at least a first set of the plurality of sensors are of a dissimilar type. In exemplary embodiments, the method is implemented on an aircraft or other vehicle.

Exemplary method 400 proceeds to block 404 with comparing rates of change for sensor data for each individual sensor of the plurality of sensors and all the other individual sensors of the plurality of sensors. In exemplary embodiments, comparing rates of change at block 404 includes determining a plurality of quotients, each of the plurality of quotients determined by dividing rate of change of a first sensor of the plurality of sensors by the rate of change of a second sensor of the plurality of sensors. In exemplary embodiments, there is a quotient that compares the rate of change for every sensor to every other sensor, though it's not necessary that there be a redundant reciprocal quotient for each pair where the rate of one is the numerator in one case and the denominator in the other case.

Exemplary method 400 proceeds to block 406 with performing a first action when the rate of change of each of the plurality of sensors is within a first threshold of all of the other plurality of sensors. In exemplary embodiments, the first action includes outputting unfiltered sensor data based on at least one of the plurality of sensors. In exemplary embodiments, the first action includes outputting first filtered sensor data based on sensor data from at least one of the plurality of sensors, where this first filtered sensor data is filtered less than second filtered sensor data described below.

Exemplary method 400 proceeds to block 408 with performing a second action when the rate of change of at least one of the plurality of sensors is not within the first threshold of at least another of the plurality of sensors. In exemplary embodiments, the second action includes outputting filtered sensor data based on sensor data from at least one of the plurality of sensors. In exemplary embodiments, the second action includes outputting second filtered sensor data based on sensor data from at least one of the plurality of sensors, where the second filtered sensor data is filtered more than the first filtered sensor data described above.

In exemplary embodiments, method 400 further includes calculating the rates of change of sensor data for each individual sensor of the plurality of sensors by finding a difference between a current sensor measurement and a previous sensor measurement; and dividing the difference by a time duration between the current sensor measurement and the previous sensor measurement, wherein the time duration between the current sensor measurement and the previous sensor measurement is the same for each individual sensor of the plurality of sensors. In exemplary embodiments, method 400 further includes determining whether the rate of change of each of the plurality of sensors is within a threshold of all of the other plurality of sensors by being configured to compare the plurality of quotients to a range of values between a lower limit and an upper limit, wherein the upper limit is a reciprocal of the lower limit. In exemplary embodiments, method 400 further includes performing a third action when the rates of change of at least one of the plurality of sensors is not within the first threshold of at least another of the plurality of sensors and when the rates of change of each of the plurality of sensors is within a second threshold of all of the other plurality of sensors, wherein the second threshold is larger than the first threshold.

As used in this description, a processing device or unit (such as, but not limited to, processor 202 described above and shown in the FIGS. 2 and 3A-3B) includes or functions with software programs, firmware or other computer readable instructions for carrying out various methods, process tasks, calculations, and control functions, used in the filtering system 200. These instructions are typically stored on any appropriate computer readable medium (such as, but not limited to, memory 204) used for storage of computer readable instructions or data structures. The computer readable medium can be implemented as any available media that can be accessed by a general purpose or special purpose computer or processor, or any programmable logic device. Suitable processor-readable media may include non-transitory storage or memory media such as magnetic or optical media. For example, non-transitory storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Example Embodiments

Example 1 includes a system comprising: a plurality of sensors measuring a physical parameter; a processing unit communicatively coupled to the plurality of sensors and configured to receive sensor data from each of the plurality of sensors; wherein the processing unit is further configured to compare rates of change between sensor data for each individual sensor of the plurality of sensors and each of the other individual sensors of the plurality of sensors; wherein the processing unit is further configured to perform a first action when the rate of change of each of the plurality of sensors is within a first threshold of all of the other plurality of sensors; and wherein the processing unit is further configured to perform a second action when the rate of change of at least one of the plurality of sensors is not within the first threshold of at least another of the plurality of sensors.

Example 2 includes the system of Example 1, wherein the processing unit is configured to compare rates of change between sensor data for each individual sensor of the plurality of sensors and each of the other individual sensors of the plurality of sensors by being configured to determine a plurality of quotients, each of the plurality of quotients determined by dividing the rate of change of a first sensor by the rate of change of a second sensor; wherein the processing unit is configured to determine whether the rate of change of each of the plurality of sensors is within a threshold of all of the other plurality of sensors by being configured to compare the plurality of quotients to a range of values between a lower limit and an upper limit, wherein the upper limit is a reciprocal of the lower limit.

Example 3 includes the system of any of Examples 1-2, wherein the first action is to output unfiltered sensor data based on sensor data from at least one of the plurality of sensors; and wherein the second action is to output filtered sensor data based on sensor data from at least one of the plurality of sensors.

Example 4 includes the system of Example 3, wherein the unfiltered sensor data responds more quickly to changes in the physical parameter; and wherein the filtered sensor data mitigates the effect of noise in the sensor data.

Example 5 includes the system of any of Examples 1-4, wherein the first action is to output first filtered sensor data based on sensor data from at least one of the plurality of sensors; and wherein the second action is to output second filtered sensor data based on sensor data from at least one of the plurality of sensors; and wherein the first filtered sensor data is filtered less than the second filtered sensor data.

Example 6 includes the system of Example 5, wherein the first filtered sensor data responds more quickly to changes in the physical parameter than the second filtered sensor data; and wherein the second filtered sensor data more effectively mitigates the effect of noise in the sensor data than the first filtered sensor data.

Example 7 includes the system of any of Examples 1-6, wherein at least two of the plurality of sensors are the same type of sensor.

Example 8 includes the system of any of Examples 1-7, wherein at least two of the plurality of sensors are different types of sensors.

Example 9 includes the system of any of Examples 1-8, wherein the processing unit is further configured to perform a third action when the rates of change of at least one of the plurality of sensors is not within the first threshold of at least another of the plurality of sensors and when the rates of change of each of the plurality of sensors is within a second threshold of all of the other plurality of sensors, wherein the second threshold is larger than the first threshold.

Example 10 includes the system of any of Examples 1-9, wherein the system is onboard one of an aircraft, a space vehicle, and a guided missile.

Example 11 includes the system of any of Examples 1-10, wherein the rate of change for each individual sensor of the plurality of sensors is calculated based on a current sensor measurement, a previous sensor measurement, and a time duration between the current sensor measurement and the previous sensor measurement, wherein the time duration between the current sensor measurement and the previous sensor measurement is the same for each individual sensor of the plurality of sensors.

Example 12 includes the system of any of Examples 1-11, wherein the plurality of sensors are selected from one of air data sensors, speed sensors, velocity sensors, accelerometers, gyroscopes, inertial measurement units, pressure sensors, location sensors, altitude and depth sensors, distance sensors, temperature sensors, and stored level sensors.

Example 13 includes a method comprising: receiving sensor data from each of a plurality of sensors measuring a physical parameter; comparing rates of change between sensor data for each individual sensor of the plurality of sensors and each of the other individual sensors of the plurality of sensors; performing a first action when the rate of change of each of the plurality of sensors is within a first threshold of all of the other plurality of sensors; and performing a second action when the rate of change of at least one of the plurality of sensors is not within the first threshold of at least another of the plurality of sensors.

Example 14 includes the method of Example 13, wherein comparing rates of change between sensor data for each individual sensor of the plurality of sensors and each of the other individual sensors of the plurality of sensors includes determining a plurality of quotients, each of the plurality of quotients determined by dividing the rate of change of a first sensor by the rate of change of a second sensor; and the method further comprising: determining whether the rate of change of each of the plurality of sensors is within a threshold of all of the other plurality of sensors by being configured to compare the plurality of quotients to a range of values between a lower limit and an upper limit, wherein the upper limit is a reciprocal of the lower limit.

Example 15 includes the method of any of Examples 13-14, wherein the first action includes outputting unfiltered sensor data based on at least one of the plurality of sensors; and wherein the second action includes outputting filtered sensor data based on sensor data from at least one of the plurality of sensors.

Example 16 includes the method of any of Examples 13-15, wherein the first action includes outputting first filtered sensor data based on sensor data from at least one of the plurality of sensors; and wherein the second action includes outputting second filtered sensor data based on sensor data from at least one of the plurality of sensors; and wherein the first filtered sensor data is filtered less than the second filtered sensor data.

Example 17 includes the method of any of Examples 13-16, further comprising calculating the rates of change of sensor data for each individual sensor of the plurality of sensors by: finding a difference between a current sensor measurement and a previous sensor measurement; and dividing the difference by a time duration between the current sensor measurement and the previous sensor measurement, wherein the time duration between the current sensor measurement and the previous sensor measurement is the same for each individual sensor of the plurality of sensors.

Example 18 includes the method of any of Examples 12-17, further comprising: performing a third action when the rates of change of at least one of the plurality of sensors is not within the first threshold of at least another of the plurality of sensors and when the rates of change of each of the plurality of sensors is within a second threshold of all of the other plurality of sensors, wherein the second threshold is larger than the first threshold.

Example 19 includes the method of any of Examples 1-18, wherein the sensors are onboard one of an aircraft, a space vehicle, and a guided missile.

Example 20 includes a system comprising: a plurality of sensors measuring a physical parameter; a processing unit communicatively coupled to the plurality of sensors and configured to receive sensor data from each of the plurality of sensors; wherein the processing device is further configured to compare rates of change between sensor data for each individual sensor of the plurality of sensors and each of the other individual sensors of the plurality of sensors; wherein the processing unit is further configured to filter sensor data when the rate of change of at least one of the plurality of sensors is not within the first threshold of at least another of the plurality of sensors.

What is claimed is:

1. A system comprising:
    a plurality of sensors configured to measure a common physical parameter and generate sensor data based on measurement of the common physical parameter;
    a processing unit communicatively coupled to the plurality of sensors and configured to receive the sensor data based on the measurement of the common physical parameter from each of the plurality of sensors;
    wherein the processing unit is further configured to compare a rate of change of sensor data for each individual sensor of the plurality of sensors with rates of change of sensor data for each of the other individual sensors of the plurality of sensors, wherein the rates of change of sensor data for each individual sensor are calculated during a common time period;
    wherein the processing unit is further configured to output at least one of unfiltered sensor data and first filtered sensor data based on sensor data from at least one of the plurality of sensors when the rate of change of sensor data for each of the plurality of sensors is within a first threshold of the rate of change of sensor data for all of the other plurality of sensors indicating that changes in the sensor data are more likely actual changes in the common physical parameter;

wherein the processing unit is further configured to output second filtered sensor data based on the sensor data from the at least one of the plurality of sensors when the rate of change of the sensor data for the at least one of the plurality of sensors is not within the first threshold of the rate of change of sensor data for at least another of the plurality of sensors indicating that changes in the sensor data are more likely noise in the output of the at least one of the plurality of sensors;

wherein the unfiltered sensor data responds more quickly to actual changes in the common physical parameter than the second filtered sensor data;

wherein the first filtered sensor data is filtered less than the second filtered sensor data and responds more quickly to actual changes in the common physical parameter than the second filtered sensor data; and wherein the second filtered sensor data includes minimized noise in the output of the at least one of the plurality of sensors compared to the at least one of the unfiltered sensor data and the first filtered sensor data.

2. The system of claim 1, wherein the processing unit is configured to compare the rate of change of sensor data for each individual sensor of the plurality of sensors with the rates of change of sensor data for each of the other individual sensors of the plurality of sensors by being configured to determine a plurality of quotients, each of the plurality of quotients determined by dividing the rate of change of sensor data for a first sensor by the rate of change of sensor data for a second sensor;

wherein the processing unit is configured to determine whether the rate of change of sensor data for each of the plurality of sensors is within the first threshold of all of the other plurality of sensors by being configured to compare the plurality of quotients to a range of values between a lower limit and an upper limit, wherein the upper limit is a reciprocal of the lower limit.

3. The system of claim 1, wherein the at least one of the unfiltered sensor data and the first filtered sensor data is the unfiltered sensor data.

4. The system of claim 1, wherein the at least one of the unfiltered sensor data and the first filtered sensor data is the first filtered sensor data.

5. The system of claim 1, wherein at least two of the plurality of sensors measure the common physical parameter using a single sensing technology.

6. The system of claim 1, wherein at least two of the plurality of sensors measure the common physical parameter using at least two different sensing technologies.

7. The system of claim 1, wherein the processing unit is further configured to output third filtered sensor data based on the sensor data from the at least one of the plurality of sensors when the rate of change of the sensor data for the at least one of the plurality of sensors is not within the first threshold of the rate of change of sensor data for at least another of the plurality of sensors and when the rate of change of sensor data for each of the plurality of sensors is within a second threshold of the rate of change of sensor data for all of the other plurality of sensors, wherein the second threshold is larger than the first threshold.

8. The system of claim 1, wherein the system is onboard one of an aircraft, a space vehicle, and a guided missile.

9. The system of claim 1, wherein the rate of change of sensor data for each individual sensor of the plurality of sensors is calculated based on a current sensor measurement, a previous sensor measurement, and a time duration between the current sensor measurement and the previous sensor measurement, wherein the time duration between the current sensor measurement and the previous sensor measurement is the same for each individual sensor of the plurality of sensors.

10. The system of claim 1, wherein the plurality of sensors are selected from one of air data sensors, speed sensors, velocity sensors, accelerometers, gyroscopes, inertial measurement units, pressure sensors, location sensors, altitude and depth sensors, distance sensors, temperature sensors, and stored level sensors.

11. A method comprising:
receiving sensor data from each of a plurality of sensors measuring a common physical parameter, the sensor data generated by each of the plurality of sensors based on measurement of the common physical parameter;

comparing a rate of change of sensor data for each individual sensor of the plurality of sensors with rates of change of sensor data for each of the other individual sensors of the plurality of sensors, wherein the rates of change of sensor data for each individual sensor are calculated during a common time period;

outputting at least one of unfiltered sensor data and first filtered sensor data based on sensor data from at least one of the plurality of sensors when the rate of change of sensor data for each of the plurality of sensors is within a first threshold of the rate of change of sensor data for all of the other plurality of sensors indicating that changes in the sensor data are more likely actual changes in the common physical parameter;

outputting second filtered sensor data based on the sensor data from the at least one of the plurality of sensors when the rate of change of the sensor data for the at least one of the plurality of sensors is not within the first threshold of the rate of change of sensor data for at least another of the plurality of sensors, indicating that changes in the sensor data are more likely noise in the output of the at least one of the plurality of sensors;

wherein the unfiltered sensor data responds more quickly to actual changes in the common physical parameter than the second filtered sensor data;

wherein the first filtered sensor data is filtered less than the second filtered sensor data and responds more quickly to actual changes in the common physical parameter than the second filtered sensor data;

wherein outputting the at least one of the unfiltered sensor data and the first filtered sensor data enables a quicker response time to actual changes in the common physical parameter; and wherein the second filtered sensor data includes minimized noise in the output of the at least one of the plurality of sensors compared to the at least one of the unfiltered sensor data and the first filtered sensor data.

12. The method of claim 11, wherein comparing a rate of change of sensor data for each individual sensor of the plurality of sensors with rates of change of sensor data for each of the other individual sensors of the plurality of sensors includes determining a plurality of quotients, each of the plurality of quotients determined by dividing the rate of change of sensor data for a first sensor by the rate of change of sensor data for a second sensor; and
the method further comprising:

determining whether the rate of change of sensor data for each of the plurality of sensors is within the first threshold of all of the other plurality of sensors by being configured to compare the plurality of quotients to a range of values between a lower limit and an upper limit, wherein the upper limit is a reciprocal of the lower limit.

13. The method of claim 11, wherein the at least one of the unfiltered sensor data and the first filtered sensor data is the unfiltered sensor data.

14. The method of claim 11, wherein the at least one of the unfiltered sensor data and the first filtered sensor data is the first filtered sensor data.

15. The method of claim 11, further comprising calculating the rates of change of sensor data for each individual sensor of the plurality of sensors by:
finding a difference between a current sensor measurement and a previous sensor measurement; and
dividing the difference by a time duration between the current sensor measurement and the previous sensor measurement, wherein the time duration between the current sensor measurement and the previous sensor measurement is the same for each individual sensor of the plurality of sensors.

16. The method of claim 11, further comprising:
performing a third action when the rate of change of sensor data for at least one of the plurality of sensors is not within the first threshold of the rate of change of sensor data for at least another of the plurality of sensors and when the rate of change of sensor data for each of the plurality of sensors is within a second threshold of the rate of change of sensor data for all of the other plurality of sensors, wherein the second threshold is larger than the first threshold.

17. The method of claim 11, wherein the sensors are onboard one of an aircraft, a space vehicle, and a guided missile.

18. A system comprising:
a plurality of sensors configured to measure a common physical parameter and generate sensor data based on measurement of the common physical parameter;
a processing unit communicatively coupled to the plurality of sensors and configured to receive the sensor data based on the measurement of the common physical parameter from each of the plurality of sensors;
wherein the processing device is further configured to compare a rate of change of sensor data for each individual sensor of the plurality of sensors with rates of change of sensor data for each of the other individual sensors of the plurality of sensors, wherein the rates of change of sensor data for each individual sensor are calculated during a common time period;
wherein the processing unit is further configured to filter sensor data more when the rate of change of sensor data for at least one of the plurality of sensors is not within the first threshold of the rate of change of sensor data for at least another of the plurality of sensors indicating that changes in the sensor data are more likely noise in the output of the at least one of the plurality of sensors and less likely actual changes in the common physical parameter;
wherein filtering sensor data more minimizes noise in the output of the at least one of the plurality of sensors; and
wherein filtering sensor data less enables a quicker response time to actual changes in the common physical parameter.

* * * * *